T. I. DUFFY.
BRAKE MECHANISM FOR MOTOR VEHICLES.
APPLICATION FILED JUNE 5, 1912.
1,076,561.
Patented Oct. 21, 1913.
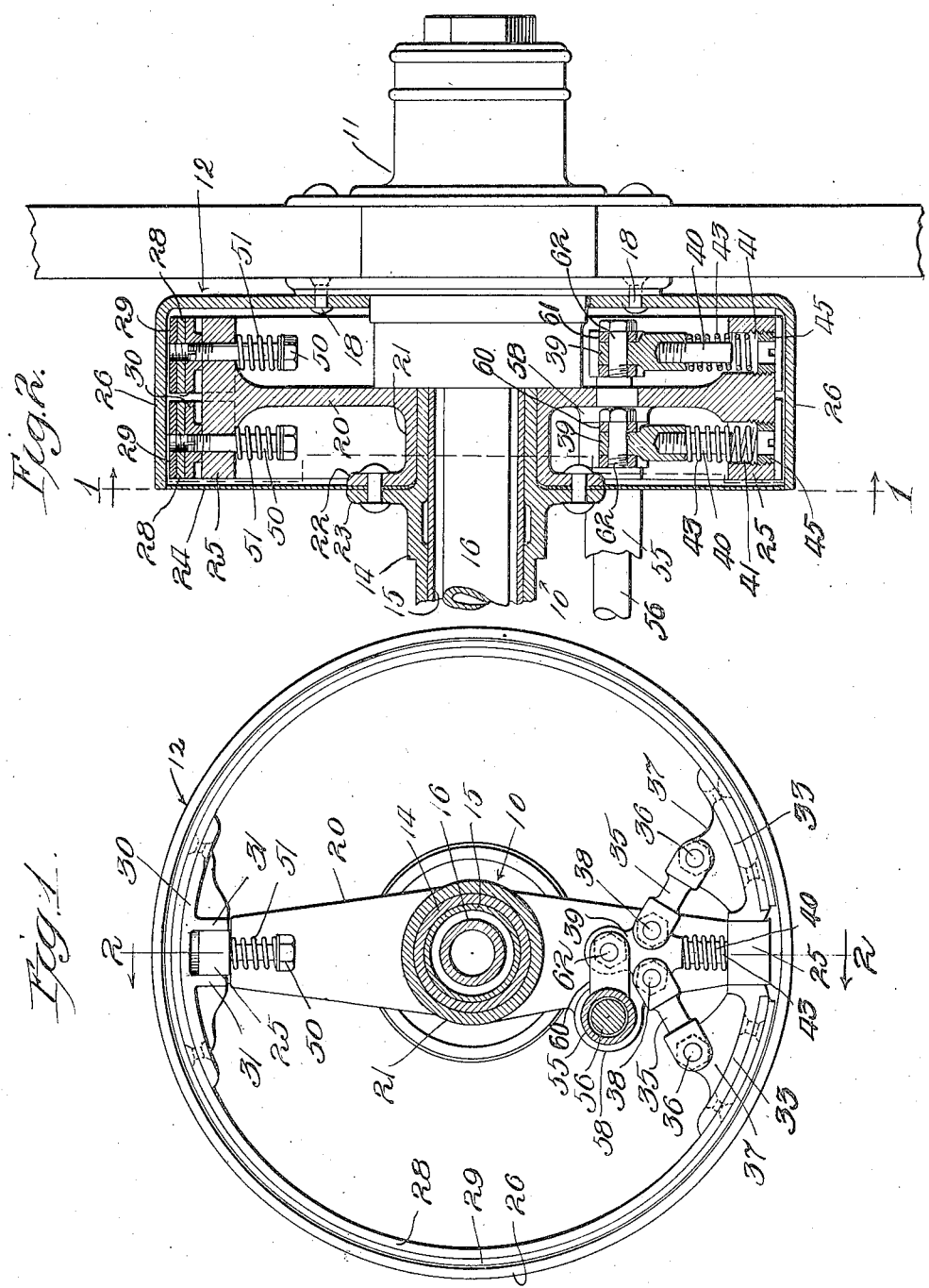
Witnesses:
Harry S. Gaither
H. C. Dowle
Inventor:
Thomas I. Duffy
by William L. Hall
Atty.

UNITED STATES PATENT OFFICE.

THOMAS I. DUFFY, OF CHICAGO, ILLINOIS, ASSIGNOR TO HENRY ELLSWORTH AND ALBERT E. CROSS, BOTH OF CHICAGO, ILLINOIS, COPARTNERS DOING BUSINESS UNDER THE FIRM-NAME OF ELLSWORTH & CROSS.

BRAKE MECHANISM FOR MOTOR-VEHICLES.

1,076,561.  Specification of Letters Patent.  Patented Oct. 21, 1913.

Application filed June 5, 1912. Serial No. 701,724.

*To all whom it may concern:*

Be it known that I, THOMAS I. DUFFY, a citizen of the United States, and a resident of Chicago, in the county of Cook and State of Illinois, have invented certain new and useful Improvements in Brake Mechanism for Motor-Vehicles; and I do hereby declare that the following is a full, clear, and exact description thereof, reference being had to the accompanying drawings, and to the characters of reference marked thereon, which form a part of this specification.

This invention relates to improvements in brake mechanisms for driving wheels of motor vehicles and to means for operating the same.

An object of the invention is to simplify and improve the construction and arrangement of the brake mechanism and to render it prompt in its action.

Another object of the invention is to provide an improved means for operating two brakes, one of which is used for service stops, and both of which are adapted to be simultaneously used for emergency stops.

The invention consists in the arrangement and construction of the parts hereinafter described and more particularly pointed out in the appended claims.

In the drawings;—Figure 1 is a view partially in section and partially in elevation of a brake embodying my invention, the section being indicated on the line 1—1 of Fig. 2. Fig. 2 is an axial section on the line 2—2 of Fig. 1.

As shown in the drawings, 10 designates as a whole the rear axle of a motor vehicle, 11, the wheel hubs mounted on the ends thereof and 12, 12 the brake drums carried by the wheel hubs. The axle comprises, as shown in Fig. 2, the tubular body portion 14, the inner tube portion 15 and the drive shaft 16. The brake drum is attached to the wheel hub in any suitable manner, as by the rivets 18, and is removable from the axle with the wheel.

20 designates a torque arm which is carried rigidly by the axle, and which extends across the brake drum within the rim of said drum. As herein shown, it is formed with a central sleeve 21 that surrounds the tubular body of the axle, and said sleeve is provided with an annular flange 22 that is riveted or otherwise secured to a flange 23 integral with the axle body. The flange 22 may also constitute means for fastening the circular closing plate or disk 24 in place, the inner margin of said disk being shown as clamped between said flange and the flange of said torque arm. The torque arm 20 is provided at its end with cross heads 25 which are arranged near the rim 26 of the brake drum and are arranged parallel to the axis of the drum.

28, 28 designate flexible, resilient brake bands arranged within the rim of the brake drum, one at each side of the plane of the torque arm and adapted to bear, preferably through the intermediary of friction faces or layers 29, against the inner annular face of the rim. The said bands are provided at the top of the drum with cast metal fittings 30, riveted or otherwise secured to the bands and said fittings are provided with inwardly extending flanges 31, 31 between which one of the cross heads 25 of the torque arm extends. The bands are provided at their ends with other fittings 33 riveted or otherwise secured to the band and between which the other cross head 25 of the torque arm extends.

35, 35 designate toggle links which are pivoted at their outer ends by the bolts 36 to the webs 37 of the fitting 33, and are pivoted at their inner ends by the bolts 38 to lateral lugs of endwise slidable plungers 39 which are carried by the torque arm. The said plungers 39, or reduced screw-threaded extensions 40 thereof, extend outwardly into recesses 41, 41 formed in the adjacent cross head 25, and springs 43, 43 are interposed between the bottoms of said recesses 41 and outwardly facing shoulders of the plungers and exert pressure which tends to hold the plungers inwardly away from the brake drum rim. Preferably the bottoms of said recesses 41 consist of screw-threaded plugs 45 of a size at least as large as the springs 43, so as to thereby afford, when removed, convenient means for inserting these springs into place and removing them.

In order to prevent the connection between the fitting 30 and the torque arm from becoming loose and rattling, I may provide the said fittings and the adjacent cross head 25 with openings and insert outwardly through said openings screw bolts 50, 50, which are screw-threaded to the fittings, and apply spiral, expansive springs 51, 51 between the bolt heads and said cross heads. Preferably the bolt openings are continued through the brake band and friction facing thereof, as shown in Fig. 2, and the outer ends of the bolts are slotted so as to permit adjustment of the bolts by means of a screw driver passed inwardly through said opening at a time when the brake drum is removed.

55, 56 designate the brake actuating rock shafts; there being, in practice, two shafts at each end of the axle, and one is shown as made hollow to receive the other. The tubular outer brake shaft 55 of each pair is mounted at its outer end in a boss 58 carried by the torque arm 20, the inner shaft being rotatively mounted in the outer rock shaft. They may be mounted at their inner ends in any suitable manner and connected to any suitable form of operating means. The said rock shafts 55, 56 are provided at their outer ends with rigidly connected arms 60, 61, respectively, which arms are loosely connected to the upper ends of the plungers 39, 39, as by means of the pivot bolts 62, 62. When said rock shafts are rocked forwardly the plungers 39 are moved outwardly against the action of the springs 43, and spread the toggle links 35 outwardly so as to thereby expand the brake band into frictional engagement with the rim of the brake drum. When the braking pressure is released the springs 43 immediately restore the parts to non-braking position. An advantage of the construction described is found in the use of the short, relatively stiff springs which act to quickly restore the parts to non-braking position when the braking pressure is released, so as to give quick release to the brakes.

In the use of the double band brake herein shown, the outer bands will usually be used for service stops, and for emergency stops both bands of each brake drum will be simultaneously set so as to secure full and simultaneous action of both bands.

I claim as my invention;—

1. Brake mechanism comprising, in combination with an axle, a brake drum mounted to rotate thereon and having a curved braking face, a single piece brake band divided at one point and adapted to be expanded against said face, a torque arm non-rotatively carried by the axle, a slidable spring held plunger carried by the torque arm and having guiding engagement therewith at the outer end of plunger, toggle links pivotally connected to said plunger radially within its guided end and to the ends of the brake band at its point of division, means for imparting endwise movement to the plunger against the action of its spring to expand the brake band against said braking face, and anchoring means for the brake band located at a point opposite to said point of division.

2. Brake mechanism comprising, in combination with an axle, a brake drum mounted to rotate thereon and having a curved braking face, a single piece brake band divided at one point and adapted to be expanded against said face, a torque arm carried by the axle, a slidable spring held plunger carried by the torque arm and having guiding engagement therewith at the outer end of the plunger, toggle links pivotally connected to said plunger radially within its guided end and to the ends of the brake band at its point of division, means for imparting endwise movement to said plunger against the action of its spring to expand the brake band against said braking face and a fitting attached to the intermediate portion of the brake band diametrically opposite to said point of division with which one end of the torque arm has spring held movable engagement.

3. Brake mechanism comprising, in combination with an axle, a brake drum mounted to rotate thereon, a brake band, a torque arm carried by the axle, a slidable spring held plunger carried by the torque arm, toggle links connecting said plunger to the ends of the brake band, means for imparting endwise movement to said plunger against the action of its spring to expand the brake band and a fitting attached to the intermediate portion of the brake band with which one end of the torque arm has sliding engagement, a headed screw extending through the torque arm and having screw-threaded engagement with the fitting and a spring surrounding said screw and interposed between the screw head and the torque arm.

4. Brake mechanism comprising, in combination with an axle, a brake drum mounted to rotate thereon, a brake band, a torque arm carried by the axle, a slidable, spring held plunger carried by the torque arm, toggle links connecting said plunger to the ends of the brake band, means for imparting endwise movement to the plunger against the action of the spring to expand the brake band, a fitting attached to the intermediate portion of the brake band with which one end of the torque arm has sliding engagement, a headed screw extending through the torque arm and having screw-threaded engagement with the fitting and a spring surrounding said screw and interposed between the screw head and the torque arm, said brake band being provided in line with said screw with an opening and the outer end of the screw being shaped for engagement by a tool adapted to be inserted through said opening.

5. Brake mechanism comprising in combination with an axle, a brake drum mounted to rotate thereon, a brake band, a torque arm carried by the axle and extending between the ends of the band and provided with a head having an inwardly opening recess, a slidable plunger carried by the torque arm, a spring interposed between the plunger and the bottom of the recess, and toggle arms connecting the plunger with the ends of the brake band, the bottom of said recess comprising a screw-threaded plug of a diameter at least as great as said spring, whereby the spring may be passed through the open bottom of the recess when the plug is removed.

6. Brake mechanism comprising, in combination with an axle, a brake drum mounted to rotate thereon and provided with a curved braking face, a divided brake band adapted to be expanded against said face, a torque arm carried by the axle, a slidable spring held plunger having guiding engagement at its outer end with the torque arm, two toggle links pivotally connected to the ends of the brake band and pivotally connected to the plunger on opposite sides of the axis of the latter and inside the outer guided end of the said plunger, anchor means connected to the brake band and means for imparting endwise movement to the plunger.

7. Brake mechanism comprising, in combination with an axle, a brake drum mounted to rotate thereon and provided with a curved braking face, a divided brake band adapted to be expanded against said face, a torque arm carried by the axle, a slidable, spring held plunger, the outer end of which has guiding engagement with the torque arm, two toggle links pivotally connected to the ends of the brake band and pivotally connected to the plunger at points intermediate its ends and on opposite sides of the axis of the latter, anchor means connected to the brake band and means for imparting endwise movement to said plunger.

In testimony that I claim the foregoing as my invention I affix my signature in the presence of two witnesses, this 27th day of May, A. D. 1912.

THOMAS I. DUFFY.

Witnesses:
   G. E. Dowle,
   W. L. Hall.